March 25, 1930.                F. L. O. WADSWORTH                1,751,567
                              NONGLARE FRONT VIEW MIRROR
                              Filed March 24, 1927        4 Sheets-Sheet 1
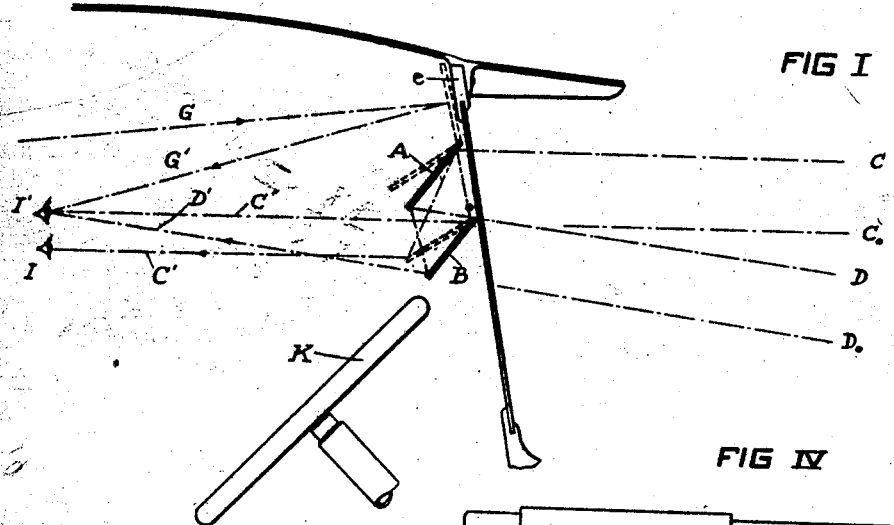
FIG I
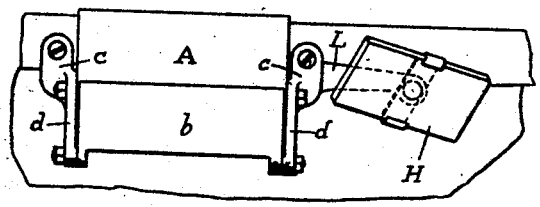
FIG IV
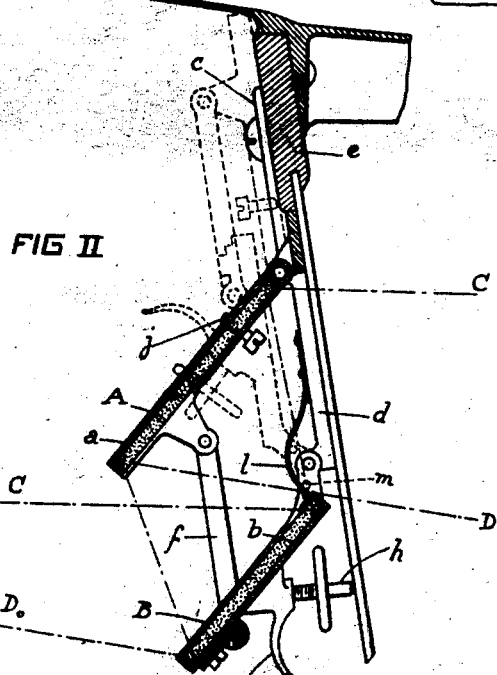
FIG II
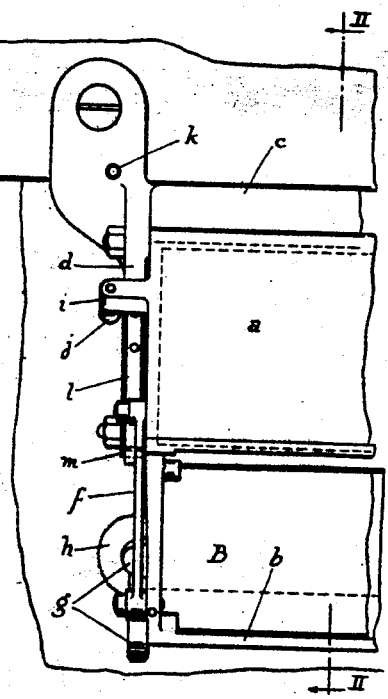
FIG III
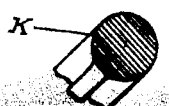
INVENTOR March 25, 1930.  F. L. O. WADSWORTH  1,751,567
NONGLARE FRONT VIEW MIRROR
Filed March 24, 1927   4 Sheets-Sheet 2
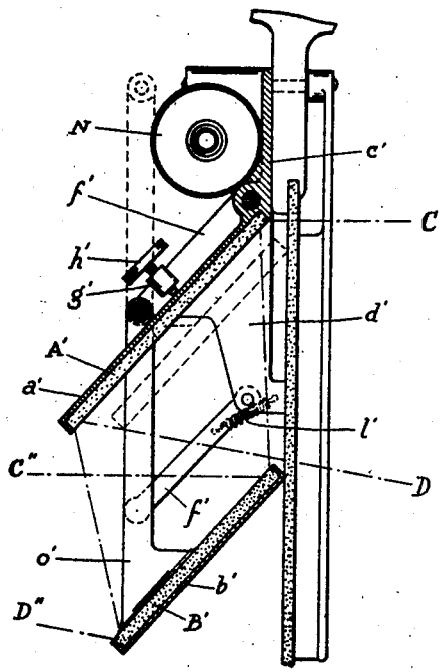
FIG V
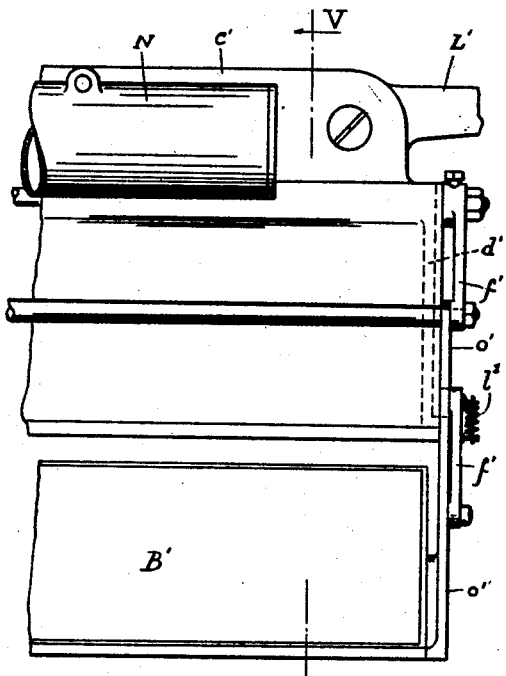
FIG VI
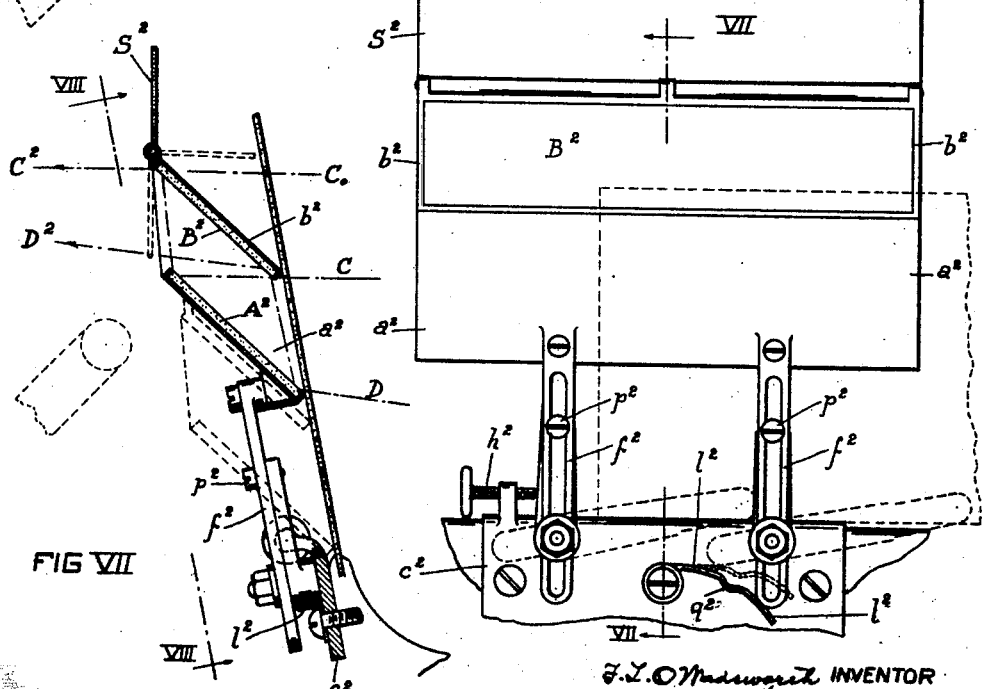
FIG VIII
FIG VII
F. L. O. Wadsworth INVENTOR

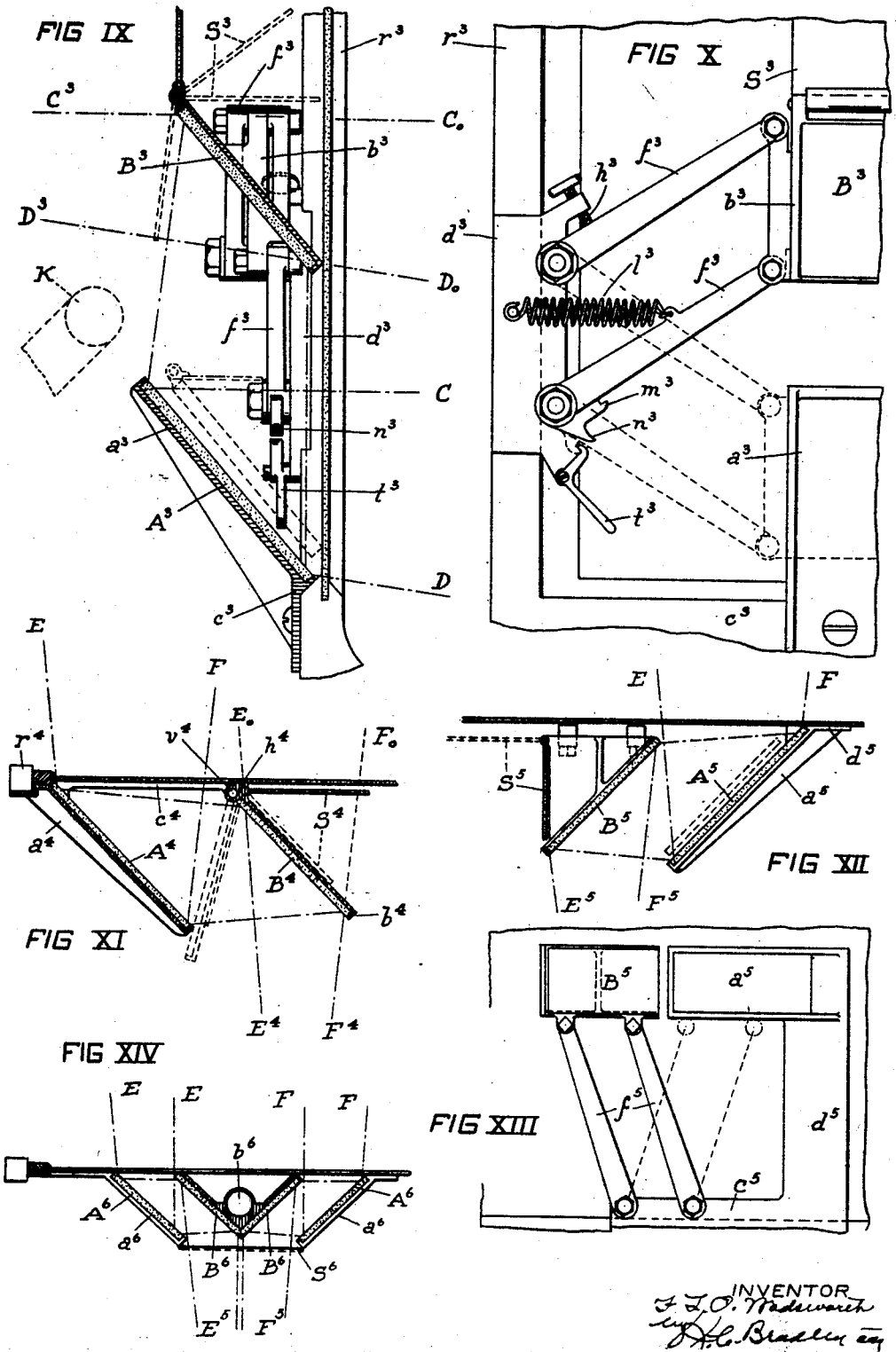

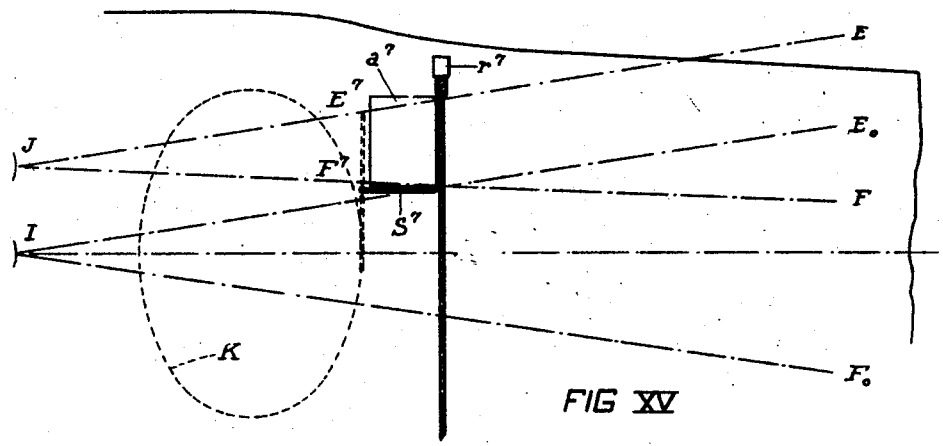
FIG XV
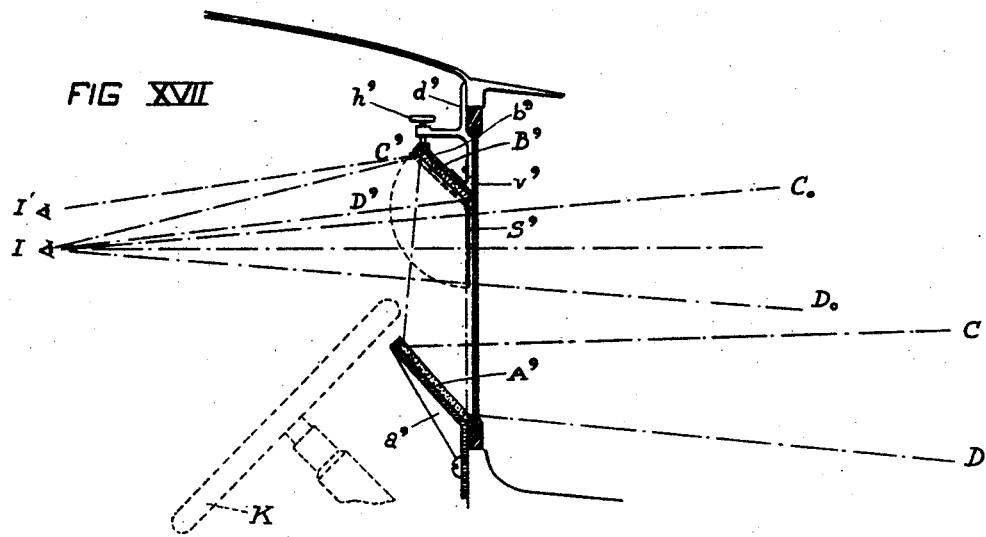
FIG XVII
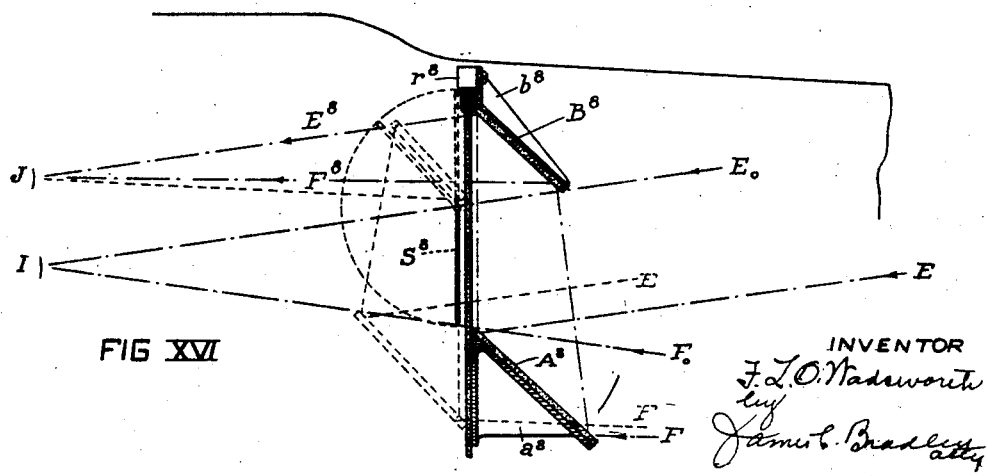
FIG XVI
INVENTOR
F. L. O. Wadsworth
by
James C. Bradley
atty Patented Mar. 25, 1930

1,751,567

UNITED STATES PATENT OFFICE

FRANK L. O. WADSWORTH, OF PITTSBURGH, PENNSYLVANIA

NONGLARE FRONT-VIEW MIRROR

Application filed March 24, 1927. Serial No. 177,991.

My invention relates to a front vision optical system for vehicle drivers, which will substantially reduce the general brightness of the field of view—for the purpose of obviating objectionable glare in the driver's eyes, etc.—without producing any apparent distortion of the said field, or any sensible displacement in the apparent position of the various objects as viewed therein. More specifically expressed, my invention comprises a combination of optical elements, which are so constructed as to absorb or suppress a substantial portion; e. g., 60 per cent to 70 per cent of the light which is transmitted thereby, and which are so arranged with respect to each other as to afford a field of view which is substantially coincident in position, and except as to brightness, substantially identical in appearance, to that which is presented when the optical system is not used;—the general purpose of this organization being, of course, to permit the driver of the vehicle to successively or alternately observe objects in front of him at their normal brightness (as determined by direct vision) or at a substantially reduced brightness (as seen by reflection) without being confused or misled as to the real position of those objects when thus viewed in the fainter light that is transmitted by the aforesaid system.

The general object of my present improvements is, therefore, to provide what may be generically described as a "front view" nonglare, or "glareproof", mirror, for automobile or locomotive drivers, through which light sources of high intensity, (such, for example, as headlights, signal lights, street arc lamps or even the direct rays of the sun when near the horizon)—or very brightly illuminated fields (such as sunlit surfaces of snow, shell covered road, etc., etc.) may be viewed directly without either ocular confusion or eye fatigue. Another object of these improvements is to provide a "front view" mirror of this character which can be readily and quickly brought into the normal line of sight, or vice versa, at the will of the user; so as to permit the latter to almost instantaneously shift from the direct to the reflected field of vision, or vice versa, as conditions may require. Still another object of my invention is to produce a complementary, or self compensating, mirror system whose desired action is not affected or adversely influenced by any bodily motion or vibration of the car or other support on which it is mounted; and which will not, therefore, produce any oscillation or "shimmeying" of the field of view as observed therein. An additional purpose of this invention is to provide a device of this nature which can be easily adjusted to varying heights, or positions, of the drivers' eyes—or more generally stated to drivers of varying stature—without changing the position of the device on the vehicle. And still another object of the present improvements is to produce a relatively simple, compact and durable construction that can be manufactured at a low cost, and which will not be unduly subject to breakage or injury under rough handling. Other characteristics and advantages of the various forms of construction which are herein presented as illustrative embodiments of this invention will be made apparent, to those skilled in this art, by the more detailed description of the accompanying drawings, in which Figure I is a vertical diagrammatic section of an ordinary automobile windshield with one form of my front view mirror applied thereto. Fig. II is an enlarged section (on the vertical plane II—II of Fig. III) which illustrates more fully various details of the construction of the mirror system shown in Fig. I. Fig. III is a vertical elevation (rear view) of the left hand side of the structure shown in Fig. II. Fig. IV is another rear view elevation (on the scale of Fig. I) which depicts a modification of the organization shown in Figs. I, II and III. Figs. V and VI are views similar to those of Figs. II and III, and illustrate another embodiment of my invention. Fig. VII is also a vertical section (on the plane VII—VII of Fig. VIII) of a third exemplification of my improved front vision mirror system. Fig. VIII is a rear view (on the plane VIII—VIII of Fig. VII) of this form of construction. Figs. IX and X are likewise a vertical section and a partial rear elevation of still another illustrative embodiment of the present improvements. Fig. XI is a semi-diagrammatic plan view of a fifth form of my invention, in which two reflecting elements are arranged in a horizontal plane. Fig. XII is another semi-diagrammatic illustration of the last mentioned type of organization. Fig. XIII is a rear elevation of the structure depicted in Fig. XII. Fig. XIV is a horizontal (plan) section of a three-mirror combination which also constitutes an embodiment of this invention. Fig. XV is a plan view similar to that of Fig. XIV and illustrates a form of my improvements in which all of the mirror elements are permanently fixed in position on the windshield panel. Fig. XVI is another plan view of a second illustrative exemplification of this fixed reflector species of a front view mirror system. And Fig. XVII is a vertical elevation or section of a third embodiment of the last mentioned form of my invention.

In the construction depicted diagrammatically in Fig. I—and illustrated more in detail in Figs. II and III—two mirror elements, A and B are mounted with their reflecting surfaces in parallelism on an inverted U-shaped bracket $c$—$d$—$d$ that is rigidly attached to the top rail $e$ of the windshield. Each of these mirrors is suitably supported in a metal frame that is pivotally attached, near its forward edge, to the side legs $d$, $d$ of the bracket member $c$—$d$—$d$; and these two supporting frame $a$, $b$ are coupled together—so as to always move in parallelism—by a pair of links $f$ arranged one at each end of the said frames. The lower frame $b$ is provided, at one end, with a depending boss and finger member $g$ which is threaded to receive a screw $h$ that is adapted to engage the windshield panel and thereby limit the downward swinging movement of the connected mirror frames $a$, $b$. The upper frame $a$ is likewise provided with a projecting boss $i$ that carries an adjustable screw $j$; and when the two frames are swung up into the dotted line position of Fig. II, the end of this screw enters a coned recess $k$ in the head of the bracket $c$—$d$ and serves to limit the upward movement of the mirror system. A flat spring $l$ which is secured to one of the vertical side legs $d$ of the bracket support, and which is engaged at its free end with a pin $m$ in the frame $b$, serves to hold the conjoined members A—$a$, B—$b$, $f$—$f$, in either the full line position, or the dotted line position, of the drawing.

When the mirror system is swung downward into the line of vision of the driver, the rays of light C, D, from objects in front of the car fall first on the upper reflector A, are thereby directed downwardly onto the lower reflector B, and are thence reflected to the observer's eye I. As long as the two reflecting surfaces are maintained in parallel relationship, each doubly reflected ray (e. g., C' or D') remains parallel to the corresponding incident ray (e. g., C or D); and the apparent position of any object at a substantial distance in front of the car—which is determined by the direction in which the rays of light from that object enter the eye—is, therefore, the same when viewed through the parallel mirror system, as it is when viewed directly. But the intensity or brightness of the objects in the mirror field of view will be reduced by the loss of light at the successive reflecting surfaces; and in order to increase this loss of light, one or both of the mirrors A and B may be so constructed as to constitute what is known as a non-glare or "glareproof" reflector; such for example as is disclosed in the Colbert Patent No. 1,603,936 of Oct. 19th, 1926. I have found by experiment that the best average results, in eliminating glare, without undue diminution in brightness of the field, is obtained when the intensity in the doubly reflected emergent beam of illumination is approximately 30 to 40 per cent of that of the incident beam; but this proportion may be varied within wide limits by a suitable choice of the materials from which the mirror elements are made.

Any change in the angular inclination of the two mirrors A and B—such, for example, as is indicated in dotted lines in Fig. I—will alter the vertical displacement of the emergent rays (e. g. C' C') with respect to the incident ray (e. g. C) and correspondingly alter the height at which the eye I must be placed to receive these rays. It is thus possible to adjust the mirror system—by turning the screw $h$—so as to accommodate drivers of different stature; and when so adjusted, no change in the position of the head is required when the mirrors are swung down into the line of sight for the purpose of eliminating glare from objects ahead of the car. When not required for this or other purposes, the entire system can be instantly swung up out of the way—into the dotted line position of Fig. II—to afford a direct and much more brightly illuminated view of the field in front.

When the two mirrors A and B are moved into their raised (dotted line) position, the outer portion of the primary reflector A projects beyond and above the corresponding end of the secondary reflector B and this exposed part of the first reflecting element may then be used, if desired, as a rear view mirror, which will receive rays, (such as G); from objects behind the driver, and reflect them (as at G') to his eye. The angle of this reflection—the corresponding rear view field—may be varied as required by the adjustment of the screw $j$. This particular feature of my improvements—viz, the combined use of one of the reflectors (e. g., A) as part of the front view mirror system and also as a rear view mirror—is not, however, an essential part of this invention; and may or may not be utilized under different conditions of use. Even when this feature is utilized, it is, in most cases, advantageous to employ an auxiliary rear view mirror H, which is mounted to the right of the driver's direct line of sight on an extension arm L of the U-shaped bracket $c$—$d$—$d$; and which is capable of adjustment in both a horizontal and a vertical plane, so as to bring any desired part of the rear view field into the observer's scope of vision.

The exemplification of my invention which is depicted in Figs. V and VI is similar in many respects to that shown on the first sheet of drawings (Figs. I to IV), but differs therefrom in having one of the front view mirror elements (e. g. A') mounted in a fixed position on the inverted U-shaped bracket $c'$—$d'$—$d'$; and also in having the other of said elements (e. g. B') mounted to move in parallelism with itself—and with the fixed element A'—as it is successively lowered into, and raised out of, the driver's line of vision. This last mentioned movement is effected by securing the mirror frame $b'$ to a pair of vertical arms $o'$, $o'$ (placed one at each end of the said frame $b'$), each of which is suspended on a pair of swinging links $f'$, $f'$, that are pivotally attached, at their outer ends, to the arm $o'$, and are correspondingly attached at their inner ends to the adjacent leg $d'$ of the fixed bracket support. The vertical position of the secondary reflector B', in its lowermost position—and the corresponding height of the driver's eye for horizontally transmitted rays—is determined or adjusted by the screw $h'$ which is threaded into the boss $g'$ on one of the links $f'$, and which is adapted to be engaged with some fixed part (e. g. the back of the frame $a'$) of the mirror mounting; and the movable mirror frame $b'$ is held in either its depressed full line position, or in its elevated dotted line position (Fig. V) by the double acting tension spring $l'$. A light touch of the finger on any part of the suspended frame elements $b'$, $o'$, $f'$ is sufficient to swing the secondary mirror B' into either its operative or its inoperative position.

In this last described embodiment of my improved construction, the suspension bracket may be utilized as a combined support for the front view mirror system and for a rear view mirror (which is mounted in the same manner as mirror H, shown in Fig. IV on a lateral extension of the bracket), and also as a base for any approved form of windshield cleaner or wiper—such as is indicated at N in Figs. V and VI—the moving blade of which is positioned in front of the mirror system A', B' and serves to keep that portion of the windshield panel free from snow, mist or dirt that would interfere with the driver's vision. This cleaning action is particularly advantageous in connection with a front view mirror because of the diminution in intensity of the reflected field of illumination.

Figs. VII and VIII illustrate another form of my invention in which both of the front view mirror elements $A^2$, $B^2$, are permanently secured in fixed relation to each other on a single box shaped frame $a^2$, $b^2$, which is pivotally attached, at its lower edge, on a pair of parallel motion links $f^2$, $f^2$, that are rockingly supported in a suitable manner (e. g., by stud bolts projecting from the plate $c^2$) on the lower rail or sash of the windshield frame. In this arrangement, the front view mirror is brought into, or moved out of, the direct field of vision (as bounded vertically by the limiting rays $C^2$, $D^2$) by swinging it laterally across the face of the windshield. A screw stop $h^2$ on the plate $c^2$ serves to limit the counterclockwise rotation of the supporting links $f^2$, $f^2$ (and the corresponding upward movement of the mirror frame $a^2$, $b^2$); and the system is held in its raised position by the flat plate spring $l^2$ that engages with the lower projecting end of one of the links $f^2$. This spring also assists the action of gravity in holding the frame $a^2$, $b^2$ in its lowermost position—as shown by dotted lines in Fig. VIII—when the link arms $f^2$, $f^2$ have been folded down against each other.

In order to obtain a greater variation in the elevated (operative) position of the mirror system than can be obtained by the adjustment of the stop $h^2$, I may construct the link arms $f^2$ $f^2$, in two sections which are clamped together in any desired position by the screws $p^2$, $p^2$, so as to vary the length of the said links and thereby increase the range of the vertical movement of the mirror frame. I can, in this manner, so adjust the position of the connected reflectors, $A^2$ $B^2$ that they will intercept any desired group of rays C, D from objects in front of the car and transmit them, at reduced intensity, to the eye of the driver. If the parts are so set that the highest ray C, $C^2$ which passes through the system is substantially horizontal, all objects which are below this horizon plane $C_0$, $C^2$ will be seen by reflection; but all objects which are above it can be viewed directly over the top edge of the secondary mirror. With such an arrangement, it is possible to see all parts of the road in front by either direct or reflected light—by slightly lifting or depressing the head—without moving the mirror frame $a^2$, $b^2$.

In order to guard the eyes against the glare of lights that may be positioned above the plane of the rays $C_0$, $C^2$, I may also provide an auxiliary screen $S^2$, which is pivotally attached to the upper edge of the frame $a^2$, $b^2$, and which can be adjusted to any desired position, either in front of, or above, or behind the secondary reflector $B^2$, (as shown by the dotted lines of Fig. VII). This screen may be made of semi-transparent or partially absorbent material—which will transmit either more or less light than is absorbed by the front view mirror system— and the brightness of the field which is viewed therethrough varies with the angle at which the said screen is set. By partially lowering the mirror frame $a^2$, $b^2$, so as to bring the screen $S^2$ into the direct line of vision, and by tilting the screen itself, one can with this combination still further vary the intensity of the light rays which reach the driver's eye under varying conditions; and thereby control the brightness of the field of view within wider limits than are obtainable by the use of the mirror system alone. The mirror screen combination $A^2$, $B^2$, $S^2$ may be held in its intermediate position (with the screen $S^2$ interposed in the direct line of vision $C^2$, $C_0$, $D^2$, $D_0$) by means of a notch $q^2$ in the spring $l^2$, which will engage with the end of the link $f^2$ at the proper point in its rocking movement.

Figs. IX and X depict a fourth exemplification of my new front view mirror structure, in which the primary reflector $A^3$ is fixed in position on the dashboard plate $c^3$, and the secondary mirror $B^3$ is movably supported in parallel relation to the first reflector element by the parallel motion links $f^3$, $f^3$ that are pivoted, at their inner extremities, to one end of the movable mirror frame $b^3$, and at their outer extremities, to a suitable bracket $d^3$ on the side pillar, $r^3$ of the windshield frame. The uppermost or active position of the secondary reflector $B^3$ is controlled or regulated by a screw $h^3$ which is carried by the bracket $d^3$, and is adapted to be engaged by one of the link arms $f^3$; and the vertically movable assemblage, $B^3$, $b^3$, $f^3$, $f^3$, is held in this position by the tension of the helical spring $l^3$. When the mirror $B^3$ is moved down into its lower or inactive position—as shown in dotted lines in Figs. IX and X—it is held there against the increased tension of this spring ($l^3$) by the engagement of a ratchet tooth, $m^3$, on the arm $f^3$, with a pawl $t^3$ on the bracket $d^3$. With this arrangement, the secondary reflector will be automatically snapped into operative position on the disengagement of the elements, $m^3$, $t^3$—(just as in previous constructions it is automatically brought to the preadjusted relationship with the primary reflector by the dual action of the elements $l$—$m$, $l'$—$f'$, $l^2$—$f^2$, etc.—and is just as quickly moved out of the driver's line of vision by the pressure of the hand on any part of the movable assemblage.

In this case, as in the one last considered (Figs. VII–VIII), the movable elements may be so adjusted that all parts of the front field above a certain plane (e. g., the plane of the rays $C^3$) may be viewed directly over the upper edge of the mirror frame $b^3$; and the light reaching the eye from objects in this field may be allowed to pass undimmed, or it may be reduced in intensity to a varied degree by the interposition of a suitable absorbing screen $S^3$ that can be tilted at different angles (to transmit a correspondingly varied quantity of the incident radiation) or folded back behind the supporting mirror frame $b^3$ (see Fig. IX). An intermediate ratchet tooth $n^3$, serves to hold the parts in such position as to bring the adjustable screen $S^3$ into the direct line of vision and thus afford the driver the opportunity of viewing the road ahead under either a greater or a less degree of illumination than is afforded by the use of the front view mirror system alone.

In the several forms of construction above described, the plane of reflection of the front view mirror system has been substantially vertical. But this is not a necessary condition in the utilization of my invention. Figs. XI, XII, XIII and XIV all illustrate other embodiments of my present improvements in which the primary and secondary reflectors of the system are arranged in laterally separated—instead of in vertically spaced—relationship; and in which the plane of reflection is, therefore, substantially horizontal. In these alternative arrangements, the primary reflector may be placed either on the left hand side of the secondary mirror (as shown in the plan view of Fig. XI) or on the right hand side thereof (as shown in Figs. XII and XIII) or it may be made in two parts ($A^5$ and $A^6$), one of which is placed on the left and the other of which is placed on the right of a centrally positioned twin reflector element ($B^6$); and the secondary mirror may be almost instantaneously snapped into, or out of, operative position by either a laterally rocking movement, (as shown in Figs. VIII, XI and XIII), or by a vertical swinging or sliding movement (as shown in Figs. V, X and XIV).

Considered somewhat more in detail, the combination shown in Fig. XI comprises, a primary reflector $A^4$, whose frame ($a^4$) is mounted in fixed position on the left hand pillar or column $r^4$ of the windshield; and a secondary mirror $B^4$, whose frame ($b^4$) is rotatably supported on a vertical pivot pin $v^4$ that is carried by the horizontal arms $c^4$ of the companion frame $a^4$. In the operative position (shown in full lines in Fig. XI) the frame $b^4$ is swung out against a suitable stop $h^4$ on the arms $c^4$; and the two reflector elements $A^4$, $B^4$ are thus maintained in preadjusted parallel relationship in both the vertical and the horizontal plane. Under such circumstances all rays (e. g. such as E—F) which emanate from objects in front of the car will be reflected from the secondary mirror $B^4$ (as at $E^4$—$F^4$) in the same direction as they impinge on the first reflector ($A^4$);

and all such objects (at any substantial distance in advance) will, therefore, appear in the same position as when they are viewed directly. When the reflector B⁴ is folded back against the edge of the primary mirror A⁴ (as shown by dotted lines in Fig. XI) it will permit of either an undimmed, or partially dimmed, view of the road ahead—depending on the position of the auxiliary screen S⁴ which is pivotally attached to the back of the frame b⁴—and we can, therefore, obtain with this arrangement (as with the previously described combinations) a widely varied control of the light intensity or brightness of approaching objects, and thereby prevent any objectionable "glare" or overstrain on the driver's eyes.

The construction diagrammatically indicated in Figs. XII and XIII comprises a primary reflector A⁵ which is mounted on a rigid U-shaped frame a⁵, d⁵, c⁵ that is secured to the lower sash of the windshield, or cab window, and a laterally movable secondary mirror B⁵, whose frame b⁵ is carried by the parallel motion links f⁵, f⁵ that are pivoted, at their lower ends, on the leg c⁵. Suitable stops and springs—similar to those shown in Fig. VIII—may be provided for controlling the full line and dotted line positions of the movable elements B⁵, f⁵, f⁵; and a semi-transparent screen S⁵ is pivoted on the back of the secondary reflector frame in such position that it may be swung out into the direct line of vision (E⁵, F⁵) when the mirror B⁵ is removed therefrom.

The front vision mirror illustrated in Fig. XIV differs from all of those thus far described in having the primary reflector constructed in two parts A⁶—A⁶, which are disposed symmetrically on opposite sides of a prism faced secondary mirror B⁶; and one result of this arrangement is that the ratio between the angular field of view—(as bounded laterally by the rays E—E⁵, F—F⁵)—and the corresponding area of each mirror face, is correspondingly diminished. The divided halves of the first mirror A⁶—A⁶ are rigidly mounted on a common frame a⁶ that is suitably secured to some member of the windshield; and the connected halves of the second mirror B⁶ are mounted, each in parallelism with its associated element A⁶, on a vertically movable frame b⁶, that can be either lifted above the plane of direct vision (as shown in Fig. V), or lowered below that plane (as in Fig. X), to obtain an open and undimmed field of view between the separated edges of the primary reflector elements A⁶—A⁶. An absorbent screen of suitable character may be pivotally attached either to one edge of the aperture between the mirrors A⁶—A⁶, (as indicated in dotted lines at S⁶), or to the vertically movable frame b⁶ so as to be capable of being readily interposed in the path of the rays E⁵—F⁵, when it is desired to alter the apparent intensity or brightness of the field to a greater degree than is attained by the use of the front view mirror alone.

The alternative combinations which are graphically illustrated on the last sheet of drawings (Figs. XV, XVI and XVII) constitute another species of my generic improvements, in which both the primary and the secondary reflectors are permanently fixed in unchanged relation, both to each other and to the vehicle supports; and the field in front is viewed either directly, or indirectly (through the front vision mirror) by slightly shifting the head;—the relative disposition and arrangement of the optical elements being such that the eye is shielded from any direct glare from bright objects in advance of the vehicle when the head is thus shifted to the position for indirect (reflected) vision.

In the arrangement of Fig. XV the front vision mirror comprises two parallel reflectors which are mounted one above the other (e. g., in the operative relationship of Figs. II, V, VII or IX), in a single frame a⁷ that is rigidly attached to the left hand pillar of an automobile windshield (or to the right hand sash bar of a locomotive driver's cab) in such position that when the head is shifted slightly from the normal position I (e. g. to a point J) the mirror system is automatically interposed between the driver's eye and any bright headlight or signal lamp on the left (passing) side of the car—(or in the case of the locomotive cab installation on the right of the track)—and the brightly illuminated field surrounding such a light—within the angle E⁷—J—F⁷ subtended by the secondary mirror—can only be viewed through the partially absorbent or non-glare combination of primary and secondary reflectors. If the "glareproof" field of view thus obtained is too restricted in range of intensity, a further variation in brightness may be secured by the use of an auxiliary screen S⁷ that is pivotally attached to the frame a⁷ in such manner that it may be interposed, at will, either in the path of the reflected rays E⁷—F⁷, or the direct rays E₀—F₀, or placed in a neutral position at one side of the reflector mounting.

Fig. XVI depicts an arrangement which is very similar to that indicated in Fig. XV, save that the two mirror elements A⁸—B⁸ are arranged in a common horizontal plane (as in Figs. XI to XIV inclusive) instead of in the vertical plane relationship of Figs. II, V, VII, IX and XV. In this exemplification of my improvements, the primary and secondary mirrors are both mounted on the outside of the windshield—or they may be alternatively arranged on the inside of that protective member, as indicated in dotted lines of Fig. XVI, and are separated laterally by a sufficient distance to afford a direct field of view of a substantial angular magnitude (e. g.

$E_0$—I—$F_0$), between the adjacent edges of the two vertical mirror frames. When the head is shifted to the position J all objects in front (within the angular field $E^8$—J—$F^8$) are seen by reflection and at a correspondingly reduced brightness, in the front view mirror system; and the intensity of illumination in either the direct or the indirect field of vision, may be further modified, as before, by the addition of the auxiliary absorbing screen $S^8$ that can be moved, at will, into either of the two dotted line positions of Fig. XVI.

Fig. XVII illustrates a partial embodiment of the present improvements in which the two reflector elements $A^9$—$B^9$ are placed one above the other—as in Figs. II, V, VII, IX, etc.—but are separated a sufficient distance to permit of an open field of view (e. g., as indicated by the rays $C_0$—I—$D_0$) between their adjacent edges. In this construction, the upper mirror $B^9$ must be inclined at a small vertical angle to the lower one ($A^9$) in order to direct the reflected rays $C^9$—$D^9$ to the eye (I) of the driver; and this slight relative inclination of the primary and secondary mirrors will produce a corresponding vertical displacement in the apparent position of the objects viewed by reflection; so that the road in front will appear as inclined upwardly (i. e., approaching cars will appear to be traveling downhill) instead of on the level. But if the complementary reflectors are mounted in horizontal parallelism, there will be no lateral or sidewise displacement of the doubly reflected rays; and, therefore, no shift in the true offset relationship of objects as viewed therein.

In this case, a change from direct to indirect vision is effected merely by tilting the head so as to look upward into the top mirror $B^9$; and in order that the latter may be readily set for most convenient observation, the frame $b^9$ is attached to the supporting bracket $d^9$ by means of a spring hinge $v^9$ and is adjusted in angular relation thereto by the screw $h^9$. In order to prevent any light from reaching the eye directly—when using the front view mirror system—a screen $S^9$ is suspended from the lower edge of the frame $b^9$; and when it is desired to obtain a direct undimmed view of the road ahead, this member may be folded back against the lower face of the upper reflector (as shown in dotted lines in Fig. XVII).

The mirrors may be variously located with respect to the normal line of vision of the driver of the vehicle, as heretofore pointed out, depending somewhat upon the specific form of mirror employed, but preferably, it is placed slightly to one side of such line of vision, as indicated in Fig. XV, this being the intended location with the constructions such as that of Figs. I to IV.

A general consideration of the various illustrative forms that are hereinbefore described as specific exemplifications of my invention makes it clear that they all present certain generic features of construction and operation; and that they also possess various individual characteristics which may or may not be utilized in all cases. But with the foregoing disclosure as a guide, those skilled in this art will be able to adapt my improvements, in whole or in part as may be desired, to any purpose for which they can be advantageously used.

What I claim is:

1. In a motor vehicle, a non-glare front vision mirror, which comprises two inclined reflecting surfaces mounted in close proximity and in substantial parallelism with each other, one of which has a reflecting surface of light absorbing composition adapted to transmit an amount of light substantially less than the light incident thereon, such mirror being located at one side of the line of normal vision of the driver, but adjacent to such line of vision.

2. A non-glare front vision mirror for vehicles, which comprises two inclined reflecting surfaces mounted in substantial parallelism with each other, one of which is of the non-glare type having a reflecting surface of absorption composition adapted to transmit less than one-half the light incident thereon, and means whereby the mirror may be adjusted so that the surface which is of the non-glare type faces to the rear at an angle such that it acts as a non-glare rear vision mirror.

3. A non-glare front vision mirror for vehicles, which comprises two inclined reflecting surfaces mounted in substantial parallelism with each other, one of which has a reflection surface of the absorption type adapted to reflect a limited portion only of the light incident thereon, means whereby the mirror may be adjusted so that one of the surfaces faces to the rear at an angle such that it acts as a rear view mirror, and means whereby the mirror is held yieldingly in either its position as a front view mirror or its position as a rear vision mirror.

4. A non-glare front vision mirror for vehicles, which comprises two inclined reflecting surfaces mounted in substantial parallelism with each other, one of which has a reflection surface of the absorption type adapted to reflect a limited portion only of the light incident thereon, and means whereby the mirror may be adjusted upward and out of the normal line of sight of the driver of the vehicle, and positioned so that one of said surfaces faces to the rear at an angle such that it acts as a rear vision mirror.

5. A non-glare front vision mirror for vehicles, which comprises two inclined reflecting surfaces mounted in substantial parallelism with each other, one of which is of the non-glare or absorption type having a coating of metallic sulphide adapted to transmit less than one-half the light incident thereon, and means whereby the mirror may be adjusted upward and out of the normal forward line of sight of the driver of the vehicle and positioned so that the surface which is of the non-glare type faces to the rear at an angle such that it acts as a non-glare rear vision mirror.

6. A non-glare front vision mirror for vehicles, which comprises a pair of oppositely facing reflectors pivotally supported at their forward edges and downwardly and rearwardly inclined from said edges, a link for maintaining the reflectors in substantial parallelism when adjusted up or down about said edges, and means whereby the reflectors are maintained at any desired position of angular adjustment, the upper of said reflectors being of the non-glare or absorption type, and serving as a non-glare rear vision reflector when swung upward so that it faces to the rear.

7. A non-glare front vision mirror for vehicles, which comprises two substantially opaque reflecting surfaces mounted in approximate parallelism with each other, one of the said surfaces being of the non-glare type, and having a composition adapted to completely absorb a substantial portion of the light incident thereon.

8. A non-glare front vision mirror for vehicles, which comprises two substantially opaque reflecting surfaces mounted in approximate parallelism with each other, one of the said surfaces comprising a coating of the light absorbing type adapted to reflect only a limited portion of the light incident thereon, the opaque reflectors being located closely adjacent to each other, so as to cut off the direct vision of the driver through the space occupied thereby.

In testimony whereof, I have hereunto subscribed my name this 22nd day of March, 1927.

FRANK L. O. WADSWORTH.